(12) United States Patent
Oku et al.

(10) Patent No.: US 10,276,879 B2
(45) Date of Patent: Apr. 30, 2019

(54) FUEL CELL

(71) Applicants: Nissan Motor Co., Ltd., Yokohama-shi, Kanagawa (JP); W. L. Gore & Associates, Co., Ltd., Tokyo (JP)

(72) Inventors: Takanori Oku, Yokohama (JP); Mitsutaka Abe, Yokohama (JP); Tomoya Nomura, Okayama (JP); Tomoyuki Takane, Okayama (JP)

(73) Assignees: Nissan Motor Co., Ltd., Yokohama (JP); W. L. Gore & Associates, Co., Ltd., Tokyo (JP)

( * ) Notice: Subject to any disclaimer, the term of this patent is extended or adjusted under 35 U.S.C. 154(b) by 0 days.

(21) Appl. No.: 14/402,110

(22) PCT Filed: Jun. 18, 2013

(86) PCT No.: PCT/JP2013/066747
§ 371 (c)(1),
(2) Date: Nov. 19, 2014

(87) PCT Pub. No.: WO2013/191181
PCT Pub. Date: Dec. 27, 2013

(65) Prior Publication Data
US 2015/0125781 A1    May 7, 2015

(30) Foreign Application Priority Data

Jun. 18, 2012 (JP) ................................ 2012-137198

(51) Int. Cl.
| | |
|---|---|
| *H01M 8/0273* | (2016.01) |
| *H01M 8/2457* | (2016.01) |
| *H01M 8/242* | (2016.01) |
| *H01M 8/2465* | (2016.01) |
| *H01M 8/0267* | (2016.01) |

(Continued)

(52) U.S. Cl.
CPC ....... *H01M 8/0273* (2013.01); *H01M 8/0247* (2013.01); *H01M 8/0258* (2013.01);
(Continued)

(58) Field of Classification Search
CPC .......................... H01M 8/0273; H01M 8/0276
See application file for complete search history.

(56) References Cited

U.S. PATENT DOCUMENTS

2004/0142226 A1\*  7/2004  Yamauchi ........... H01M 8/0258
                                                                 429/437
2005/0255367 A1   11/2005  Takahashi et al.
(Continued)

FOREIGN PATENT DOCUMENTS

| CN | 100394635 C | 6/2008 |
|---|---|---|
| CN | 101790811 A | 7/2010 |

(Continued)

*Primary Examiner* — Wojciech Haske
(74) *Attorney, Agent, or Firm* — Global IP Counselors, LLP

(57) ABSTRACT

A fuel battery cell has a membrane electrode assembly, a frame, a pair of separators, and support members. The membrane electrode assembly is formed with an anode and a cathode bonded so as to face an electrolyte membrane. The frame holds the periphery of the membrane electrode assembly. The pair of separators sandwich the frame holding the membrane electrode assembly. The support members protrude along an edge part of the frame so as to pass beyond the frame and support the membrane electrode assembly.

18 Claims, 6 Drawing Sheets

(51) Int. Cl.
*H01M 8/0258* (2016.01)
*H01M 8/1004* (2016.01)
*H01M 8/0247* (2016.01)
*H01M 8/0297* (2016.01)
*H01M 8/1018* (2016.01)

(52) U.S. Cl.
CPC ....... *H01M 8/0267* (2013.01); *H01M 8/0297* (2013.01); *H01M 8/1004* (2013.01); *H01M 8/242* (2013.01); *H01M 8/2457* (2016.02); *H01M 8/2465* (2013.01); *H01M 2008/1095* (2013.01)

(56) References Cited

U.S. PATENT DOCUMENTS

| | | | | |
|---|---|---|---|---|
| 2009/0017362 | A1* | 1/2009 | Hayashi | H01M 8/0247 429/457 |
| 2009/0286121 | A1* | 11/2009 | Morimoto | H01M 8/0273 429/494 |
| 2011/0143252 | A1* | 6/2011 | Unoki | H01M 8/0273 429/480 |

FOREIGN PATENT DOCUMENTS

| | | |
|---|---|---|
| JP | 2005-100970 A | 4/2005 |
| JP | 2006-310104 A | 11/2006 |
| JP | 2008-146872 A | 6/2008 |
| JP | 2010-108803 A | 5/2010 |
| JP | 2010-140716 A | 6/2010 |
| WO | 2008/001755 A1 | 1/2008 |

\* cited by examiner

FUEL CELL

CROSS-REFERENCE TO RELATED APPLICATIONS

This application is a U.S. National stage application of International Application No. PCT/JP2013/066747, filed Jun. 18, 2013, which claims priority to Japanese Patent Application No. 2012-137198 filed in Japan on Jun. 18, 2012, the contents of which are hereby incorporated herein by reference.

BACKGROUND

Field of the Invention

The present invention relates to a fuel battery cell.

Background Information

There is recent focus on fuel batteries as power sources that impose a small load on the environment. A fuel battery causes a chemical reaction with supplied hydrogen gas and oxygen gas, for example, and converts the produced chemical energy into electrical energy. A fuel battery has virtually no adverse impact on the global environment because the physical substance produced by the chemical reaction is water in principle.

In a fuel battery, a plurality of fuel battery cells are fastened in a stacked state, and hydrogen gas and oxygen gas are supplied. Therefore, a constant surface pressure is applied to the fuel battery cells along the direction of stacking. A membrane electrode assembly (MEA) provided to each fuel battery cell has comparatively low strength.

Therefore, when surface pressure acts on the membrane electrode assembly, there is a possibility that the membrane electrode assembly will break. In view of this, there are configurations in which rigidity against bending stress in the fuel battery cells is improved by providing reinforcing members to the diffusion layers of the fuel battery cells (see Japanese Laid-Open Patent Application No. 2006-310104, for example).

SUMMARY

However, in the configuration of Japanese Laid-Open Patent Application No. 2006-310104, the manufacturing steps have become complicated and manufacturing cost have increased because reinforcing members are disposed on the diffusion layers of the fuel battery cells. There is also a demand to make handling easier by holding the periphery of the membrane electrode assembly with a frame, and to improve rigidity against the bending stress of the fuel battery cell to prevent breaking of the membrane electrode assembly.

The present invention was devised in order to solve the problems described above, and an object of the invention is to provide a fuel battery cell that can, by means of a simple configuration, prevent breaking of the bonded part between the membrane electrode assembly and the frame even when surface pressure acts on the membrane electrode assembly.

The fuel battery cell according to the present invention which achieves the object described above has a membrane electrode assembly, a frame, a pair of separators, and support members. The membrane electrode assembly is formed with an anode and a cathode bonded so as to face an electrolyte membrane. The frame holds the periphery of the membrane electrode assembly, and contacts a flow channel via which hydrogen-containing gas or oxygen-containing gas is distributed. The pair of separators sandwich the frame holding the membrane electrode assembly. The fuel battery cell according to the present invention is characterized in that the support members are provided to the one side of the frame on which the flow channel is formed, and protrude along an edge part of the frame so as to pass beyond the frame and support the membrane electrode assembly.

In the fuel battery cell of the present invention configured as described above, the support members protrude along an edge part of the frame so as to pass beyond the frame and support the membrane electrode assembly. Therefore, according to the fuel battery cell of the present invention, even if surface pressure acts on the membrane electrode assembly, the surface pressure is dispersed to the frame via the support members, and an excessive load is not imposed on the bonded region between the membrane electrode assembly and the frame. Specifically, even if surface pressure acts on the membrane electrode assembly of which the periphery is held in the frame, the bonded region between the membrane electrode assembly and the frame does not easily break.

BRIEF DESCRIPTION OF THE DRAWINGS

Referring now to the attached drawings which form a part of this original disclosure.

DETAILED DESCRIPTION OF THE EMBODIMENTS

Figure 1:
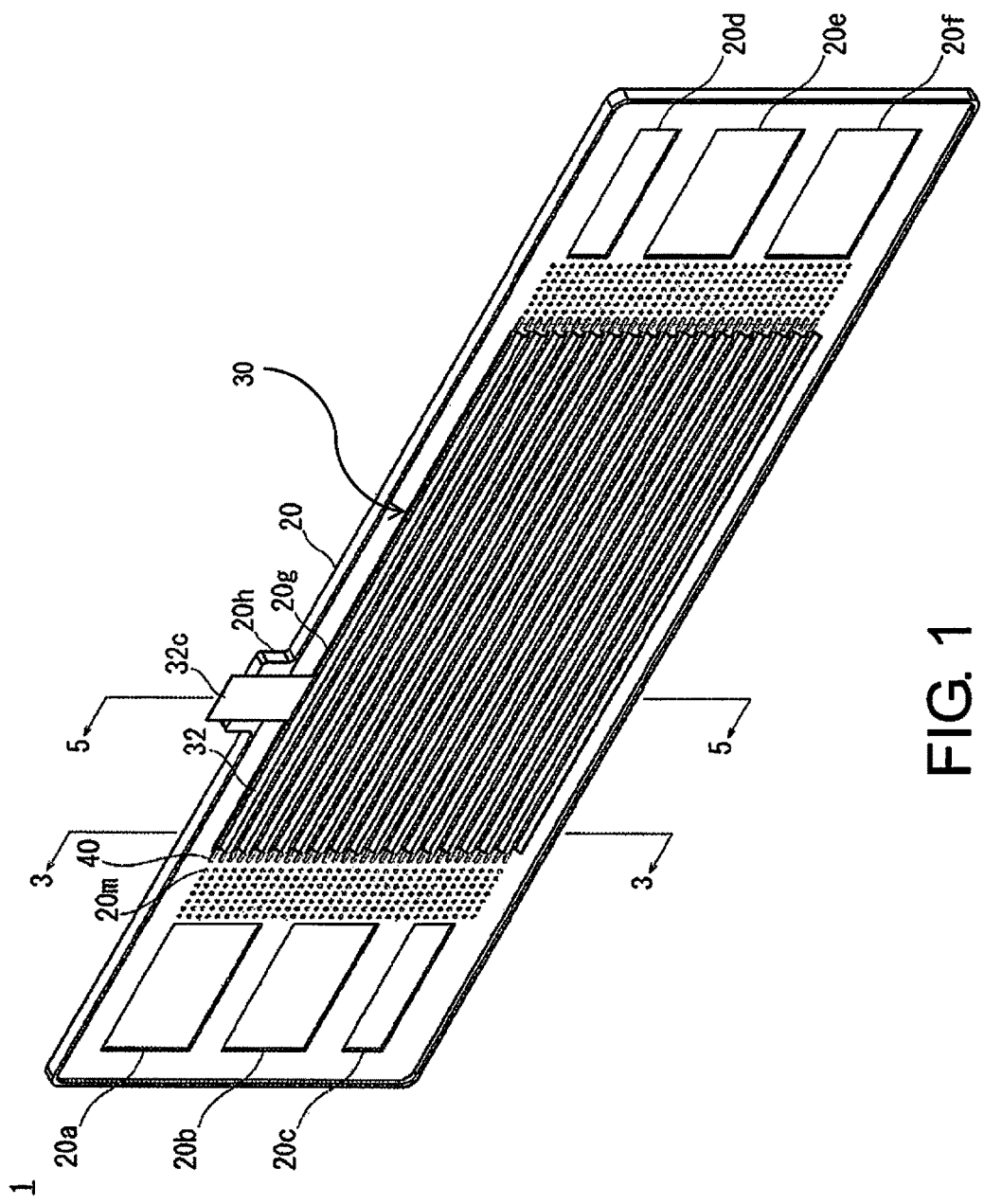
FIG. 1 is a perspective view showing a fuel battery cell according to the present embodiment.

Embodiments of the present invention are described below with reference to the accompanying drawings. The same symbols are used to denote the same elements in the descriptions of the drawings, and redundant descriptions are omitted. The sizes and proportions of the members in the drawings are sometimes exaggerated for a more convenient description and are different from the actual sizes and proportions.

Figure 2:
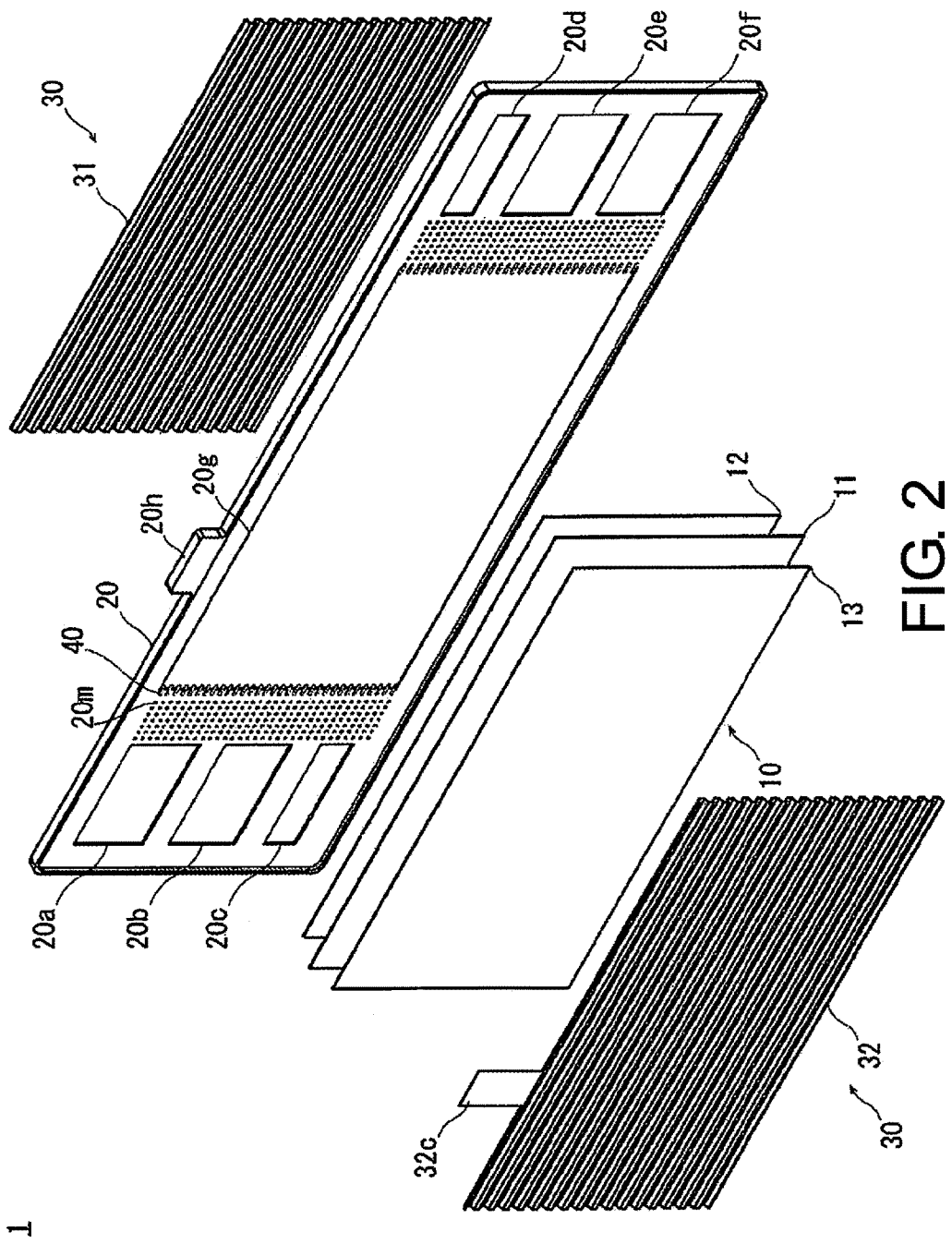
FIG. 2 is a perspective view showing an exploded view of each constituent member of the fuel battery cell.
Figure 3:
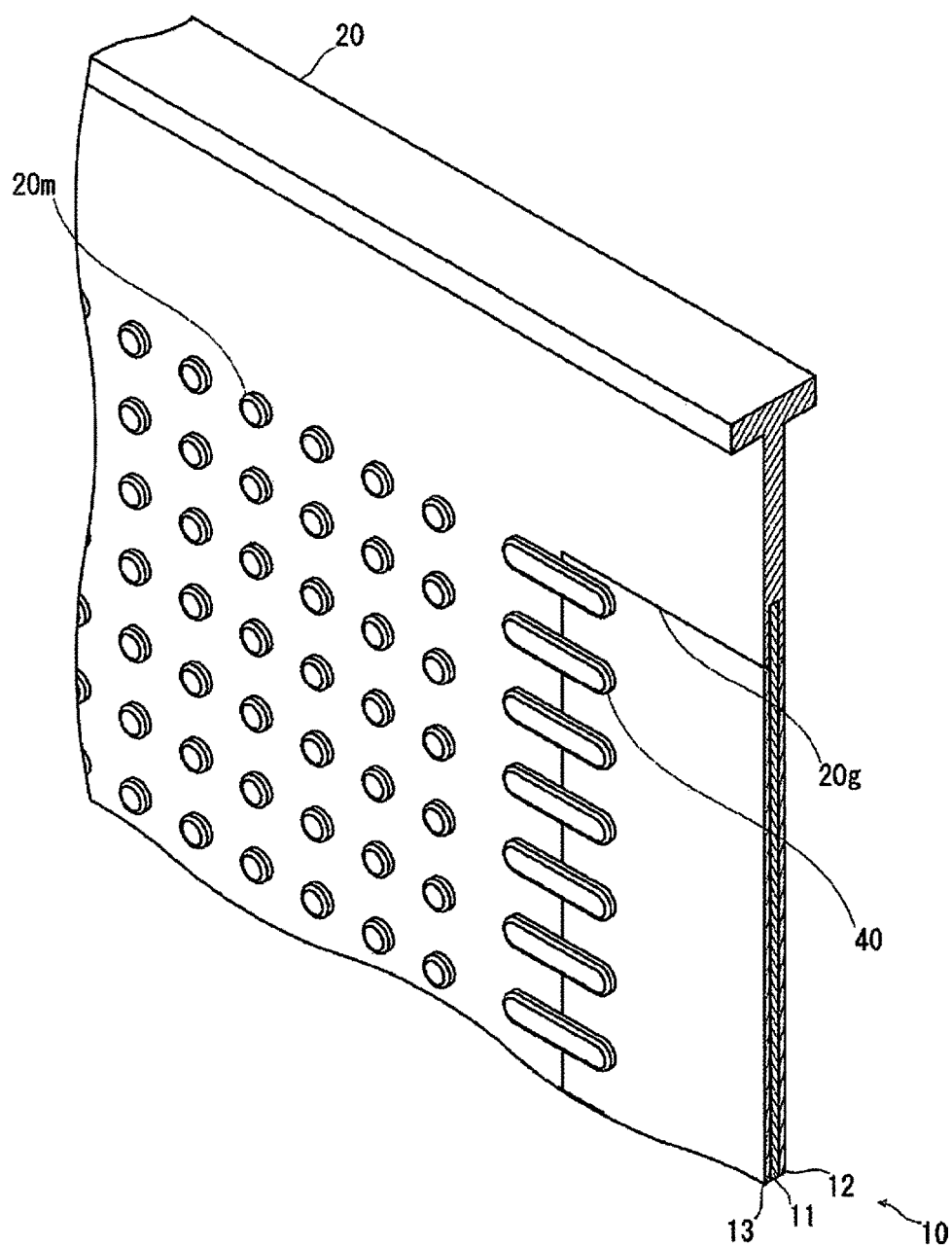
FIG. 3 is a perspective view showing a frame of the fuel battery cell, a plurality of support members, and part of a membrane electrode assembly in a cross section at the position of line 3-3 of FIG. 1.
Figure 4:
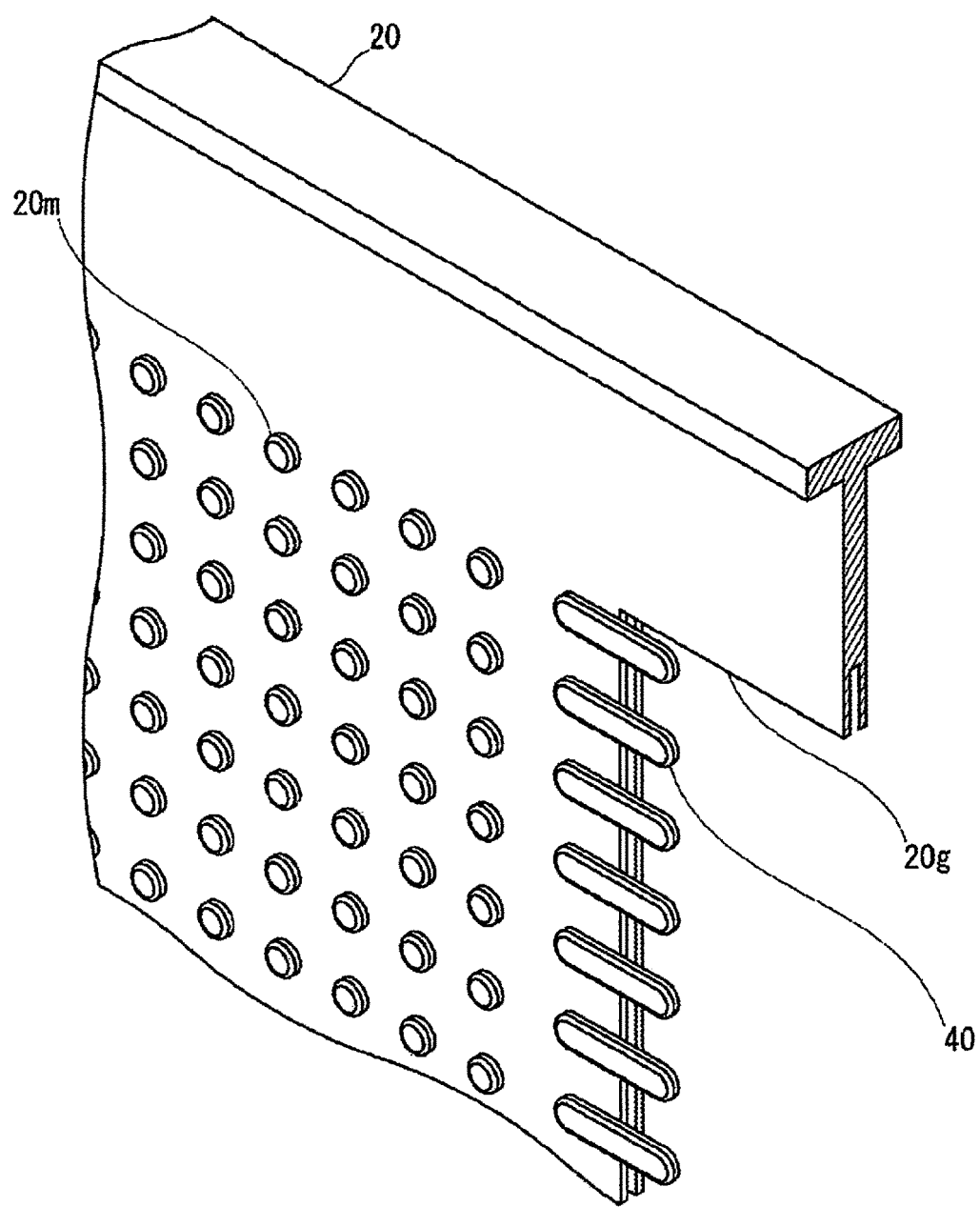
FIG. 4 is a perspective view omitting the membrane electrode assembly from the fuel battery cell shown in FIG. 3.
Figure 5:
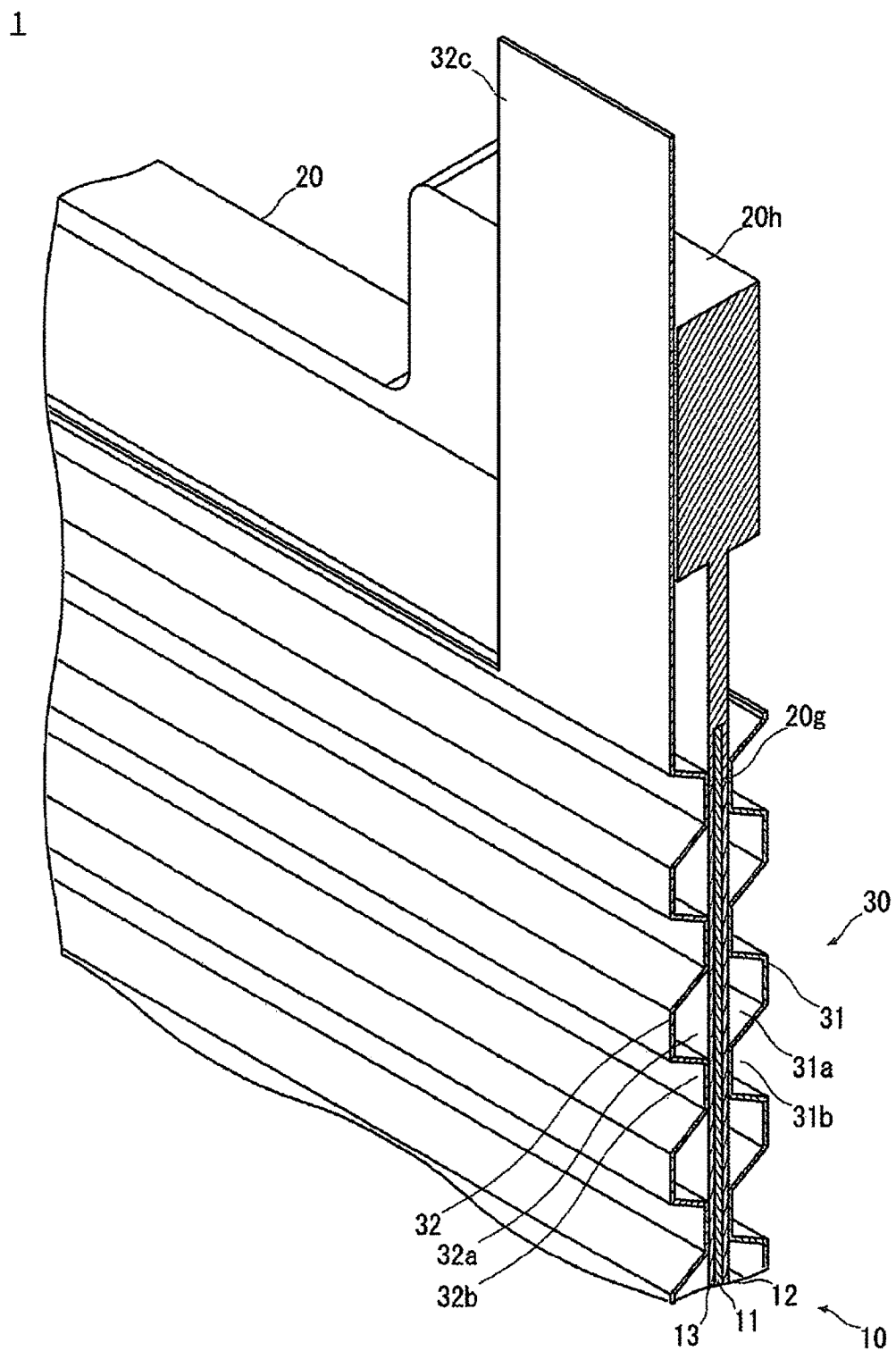
FIG. 5 is a perspective view showing the fuel battery cell in a cross section at the position of line 5-5 of FIG. 1.

FIG. 1 is a perspective view showing a fuel battery cell 1. FIG. 2 is a perspective view showing an exploded view of each constituent member of the fuel battery cell 1. FIG. 3 is a perspective view showing a frame 20 of the fuel battery cell 1, a plurality of support members 40, and part of a membrane electrode assembly 10 in a cross section at the position of line 3-3 of FIG. 1. FIG. 4 is a perspective view omitting the membrane electrode assembly 10 from the fuel battery cell 1 shown in FIG. 3. FIG. 5 is a perspective view showing part of the fuel battery cell 1 in a cross section at the position of line 5-5 of FIG. 1.

To give a summary of the fuel battery cell 1, the fuel battery cell has a membrane electrode assembly 10 in which an anode 12 and a cathode 13 are bonded so as to face an electrolyte membrane 11, the frame 20 for holding the periphery of the membrane electrode assembly 10, and a pair of separators 30 sandwiching the frame 20 holding the membrane electrode assembly 10. Furthermore, the fuel battery cell 1 has a plurality of support members 40 protruding along the edge part of the frame 20 so as to pass beyond the frame and supporting the membrane electrode assembly 10. The configurations of the membrane electrode assembly 10, the frame 20, the pair of separators 30, and the plurality of support members 40 of the fuel battery cell 1 are sequentially described in detail below with reference to FIGS. 1 to 5.

In the membrane electrode assembly 10, the anode 12 and the cathode 13 are bonded so as to face the electrolyte membrane 11 as shown in FIGS. 2 and 5. The electrolyte membrane 11 is comprising a solid polymeric material, for example, and is formed into a thin plate shape. A fluororesin that conducts hydrogen ions and has good electrical conductivity when wet, for example, is used for the solid polymeric material. The anode 12 is configured by stacking an electrode catalyst layer, a water-repellent layer, and a gas diffusion layer, and is formed into a thin plate shape slightly smaller than the electrolyte membrane 11. The cathode 13 is configured by stacking an electrode catalyst layer, a water-repellent layer, and a gas diffusion layer, and is formed into a thin plate shape the same size as the anode 12. The electrode catalyst layers of the cathode 13 and anode 12 include a polymeric electrolyte and an electrode catalyst in which a catalyst component is supported on an electroconductive carrier. The gas diffusion layers of the cathode 13 and anode 12 are formed from carbon cloth, carbon paper, or carbon felt woven from threads comprising sufficiently gas-diffusive and electroconductive carbon fibers, for example. The membrane electrode assembly 10 described above is commonly referred to as an MEA.

The frame 20 holds the outer periphery of the membrane electrode assembly 10 as shown in FIGS. 2 and 3. The frame 20 comprises an electrically insulating resin, for example, and is integrally molded into an oblong plate shape in a state of holding the outer periphery of the membrane electrode assembly 10 with a holding part 20g opened into the interior. The edge of the holding part 20g opened into the interior is equivalent to the edge part of the frame 20. A supporting part 20h of the frame 20 supports a terminal part 32c of a second separator 32 of the pair of separators 30, described hereinafter. In one end of the frame 20 in the longitudinal direction thereof, a cathode gas supply port 20a, a cooling fluid supply port 20b, and an anode gas supply port 20c are formed as through-holes. In the other end of the frame 20 in the longitudinal direction, an anode gas discharge port 20d, a cooling fluid discharge port 20e, and a cathode gas discharge port 20f are formed as through-holes.

In the frame 20, ribs 20m comprising convexities formed into columnar shapes are disposed in a matrix configuration from the cathode gas supply port 20a or the cathode gas discharge port 20f toward the membrane electrode assembly 10.

The purpose of the ribs 20m of the frame 20 is to ensure cathode gas flow channels form in the periphery of the fuel battery cell 1 when the cell is stacked and set in place. Specifically, cathode gas supplied from the cathode gas supply port 20a of the frame 20 is distributed through the membrane electrode assembly 10 along the ribs 20m. The ribs 20m are integrally formed in the frame 20. The ribs 20m are formed in the frame 20 also from the cathode gas discharge port 20f of the frame 20 toward the membrane electrode assembly 10.

The pair of separators 30 sandwich the frame 20 holding the membrane electrode assembly 10 as shown in FIGS. 2 and 5. The pair of separators 30 comprise a first separator 31 bonded to one side of the frame 20 holding the membrane electrode assembly 10, and the second separator 32 bonded to the other side facing one surface of the frame 20 and comprising the terminal part 32c.

The first separator 31 is bonded to one side of the frame 20 holding the membrane electrode assembly 10. The first separator 31 comprises a metal having an electroconductive material, and is formed into a thin plate shape larger than the anode 12. The first separator 31 is formed with a plurality of uneven concavities and convexities disposed so as to form the flow channels described hereinafter, as can be seen from the side surface that is bonded with the fuel battery cell 1. Specifically, the first separator 31 is formed by press-molding so that the plurality of concave and convex shapes are aligned at constant intervals. The first separator 31 is adjacent to the anode 12 side of the membrane electrode assembly 10, but may be adjacent to the cathode 13 side. When the first separator 31 is viewed from the side surface, the areas of the plurality of concave and convex shapes that are on the side in contact with the anode 12 are equivalent to anode gas flow channels 31a for supplying anode gas to the anode 12. The areas of the plurality of concave and convex shapes associated with the first separator 31 that are on the side not in contact with the anode 12 are equivalent to cooling water flow channels 31b through which cooling water for cooling the fuel battery cell 1 flows.

The second separator 32 is bonded to the other side that faces a surface of the frame 20, and the second separator comprises the terminal part 32c. Similar to the first separator 31, the second separator 32 comprises a metal having an electroconductive material, and is formed into a thin plate shape larger than the cathode 13. A voltage-measuring connector (not shown) is interlocked with the terminal part 32c, and the voltage of the electric power generated by the membrane electrode assembly 10 is measured. The terminal part 32c protrudes in a direction toward the outer side of the membrane electrode assembly 10 so as to face at least part of the supporting part 20h of the frame 20. Similar to the first separator 31, the second separator 32 is formed with a plurality of uneven concavities and convexities provided so as to form the flow channels described hereinafter, as can be seen from the side surface that is bonded with the fuel battery cell 1. Specifically, the second separator 32 is formed by press molding so that the plurality of concave and convex shapes are aligned at constant intervals. The second separator 32 is provided to the cathode 13 side of the membrane electrode assembly 10, but may be provided to the anode 12 side.

In the second separator 32, the areas of the plurality of concave and convex shapes on the side in contact with the cathode 13 are equivalent to cathode gas flow channels 32a for supplying cathode gas to the cathode 13. The areas of the plurality of concave and convex shapes associated with the second separator 32 that are on the side not in contact with the cathode 13 are equivalent to cooling water flow channels 32b through which cooling water for cooling the fuel battery cell 1 flows. Specifically, in adjacent fuel battery cells 1, the cooling water flow channels 31b of the first separator 31 of one fuel battery cell 1 and the cooling water flow channels 32b disposed on the second separator 32 of another fuel battery cell 1 face each other. Therefore, in adjacent fuel battery cells 1, a cooling water flow channel 31*b* of a first separator 31 and a cooling water flow channel 32*b* disposed on a second separator 32 form a single cooling water flow channel.

The plurality of support members 40 protrudes along the edge part of the frame 20 so as to pass beyond the frame and supports the membrane electrode assembly 10, as shown in FIGS. 3 and 4. The support members 40 acts as pawls for reinforcing the membrane electrode assembly 10. The edge part of the frame 20 is equivalent to the edge of a holding part 20*g* opened into the interior. The support members 40 comprises convexities formed into rectangular shapes using an electrically insulating resin, for example. A plurality of the support members 40 are disposed at predetermined intervals along the edge part of the frame 20 so as to support the membrane electrode assembly 10. Due to the support members 40 being disposed on the frame 20, if surface pressure is applied to the membrane electrode assembly 10, the surface pressure is dispersed to the frame 20 via the support members 40, and an excessive load is not imposed on the bonded region between the membrane electrode assembly 10 and the frame 20.

A plurality of the support members 40 are formed along the opposing edge part within the edge part of the frame 20 comprising a rectangular shape. For example, the support members 40 are formed at both longitudinal ends of the holding part 20*g* opened in an oblong shape into the frame 20. A plurality of the support members 40 are formed in parallel with the flow channels for distributing hydrogen-containing gas or oxygen-containing gas. Specifically, the support members 40 do not hinder the distribution of hydrogen-containing gas or oxygen-containing gas, but streamline the flow of hydrogen-containing gas or oxygen-containing gas.

A plurality of the support members 40 are adjacent to (or disposed on) a surface of either the anode 12 or the cathode 13. For example, a plurality of the support members 40 are adjacent to (or disposed on) a surface of the cathode 13, as shown in FIG. 4. This is applied in the case of a configuration in which surface pressure acts unilaterally in a direction from the anode 12 side toward the cathode 13 side. Due to a plurality of the support members 40 being adjacent to (or disposed on) the surface on the cathode 13 side, if surface pressure acts in a direction from the anode 12 side toward the cathode 13 side, the membrane electrode assembly 10 is supported by the support members 40 from the side opposite the surface on which the surface pressure is acting.

The support members 40 are formed integrally in the frame 20. Therefore, support members 40 pressed into the membrane electrode assembly 10 do not easily peel away from the frame 20 and do not easily tear.

When the membrane electrode assembly 10 needs to be firmly supported by the support members 40, the support members 40 may be bonded to the membrane electrode assembly 10 by adhesion, welding, or the like. According to such configuration, the support members 40 need only be adjacent to (or disposed on) one surface, either on the anode 12 side or the cathode 13 side, particularly even when the fuel battery cell 1 is configured such that surface pressure is applied in both the direction from the anode 12 side toward the cathode 13 side and the direction from the cathode 13 side toward the anode 12 side.

The effect achieved by providing a plurality of the support members 40 to the fuel battery cell 1 is described with reference to FIG. 6.

Figure 6:
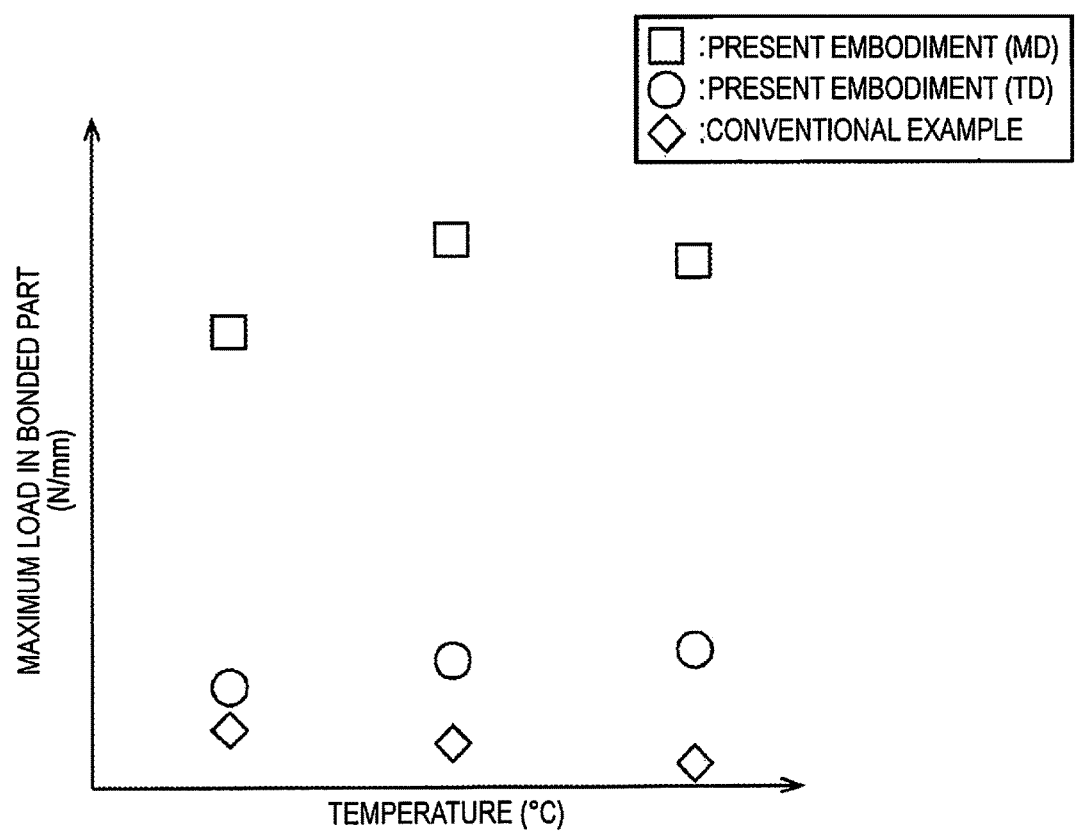
FIG. 6 is a graph showing the effect of providing a plurality of support members to the fuel battery cell.

FIG. 6 is a graph showing the effect of providing a plurality of the support members 40 to the fuel battery cell 1.

In the bonded part between the frame 20 and the membrane electrode assembly 10, the maximum load (N/mm) immediately before the bonded part cleaved was measured at three temperatures, from room temperature to a high temperature. The conventional example, represented by the diamonds, is the results of measuring the maximum load in the bonded part between the frame 20 and the membrane electrode assembly 10 in a configuration without any of the support members 40 of the present embodiment. The present embodiment (TD), represented by the circles, is the result of measuring the maximum load in the bonded part between the frame 20 and the membrane electrode assembly 10 in a configuration in which the support members 40 protrude a predetermined distance from the edge part of the frame 20 toward the membrane electrode assembly 10. The annotation TD in the drawing stands for transverse direction. The present embodiment (MD), represented by the squares, is a state in the bonded part between the frame 20 and the membrane electrode assembly 10 in which the support members 40 protrude a predetermined distance from the edge part of the frame 20 toward the membrane electrode assembly 10. Shown here are the results of measuring the maximum load in a configuration in which the support members 40 extend a predetermined distance along the edge part of the frame 20 in this state. The annotation MD in the drawing stands for machine direction.

The maximum load (N/mm) immediately before cleaving of the bonded part between the frame 20 and the membrane electrode assembly 10 does not exhibit significant dependency on temperature in the conventional example represented by diamonds, the present embodiment (TD) represented by circles, or the present embodiment (MD) represented by squares. In the present embodiment (TD) represented by circles and the present embodiment (MD) represented by squares, the maximum load (N/mm) in the bonded part between the frame 20 and the membrane electrode assembly 10 improves more than in the conventional example represented by diamonds. In the present embodiment (MD) represented by squares in particular, the maximum load (N/mm) in the bonded part between the frame 20 and the membrane electrode assembly 10 improves significantly more than in the conventional example represented by diamonds.

According to the fuel battery cell 1 of the present embodiment described above, the following effects are achieved.

In the fuel battery cell 1, a plurality of the support members 40 protrude along the edge part of the frame 20 so as to pass beyond the frame, and the membrane electrode assembly 10 is supported by the plurality of support members 40.

According to the fuel battery cell 1 thus configured, the plurality of support members 40 protrude along the edge part of the frame 20 so as to pass beyond the frame, and support the membrane electrode assembly 10. Therefore, according to the fuel battery cell 1, if surface pressure acts on the membrane electrode assembly 10, the surface pressure is dispersed to the frame 20 via the support members 40, and an excessive load is not imposed on the bonded region between the membrane electrode assembly 10 and the frame 20. Specifically, the bonded part between the membrane electrode assembly 10 and the frame 20 does not easily break even if surface pressure acts on the membrane electrode assembly 10 of which the periphery is held in the frame 20.

Furthermore, the fuel battery cell 1 may be configured with a plurality of support members 40 formed along opposing edge parts within the edge part of the frame 20, the edge part of the frame comprising a rectangular shape.

According to the fuel battery cell 1 thus configured, the support members 40 are formed at both longitudinal ends of the holding part 20g opened in an oblong shape in the frame 20, for example. Therefore, the membrane electrode assembly 10 can be firmly supported at both longitudinal ends of the holding part 20g.

Furthermore, the fuel battery cell 1 may be configured with a plurality of the support members 40 formed in parallel with the flow channels for distributing hydrogen-containing gas or oxygen-containing gas.

According to the fuel battery cell 1 thus configured, the support members 40 do not hinder the distribution of hydrogen-containing gas or oxygen-containing gas. Furthermore, according to the fuel battery cell 1 thus configured, the hydrogen-containing gas or oxygen-containing gas can be streamlined.

Furthermore, the fuel battery cell 1 may be configured with a plurality of the support members 40 provided to a surface of either the anode 12 or the cathode 13.

According to the fuel battery cell 1 thus configured, in a configuration in which surface pressure acts unilaterally in a direction from the anode 12 side toward the cathode 13 side, a plurality of the support members 40 are provided to the cathode 13 side which is equivalent to the side opposite the surface where surface pressure acts, ensuring that an excessive load is not imposed on the bonded region between the membrane electrode assembly 10 and the frame 20. On the other hand, in a configuration in which surface pressure acts unilaterally in a direction from the cathode 13 side toward the anode 12 side, for example, a plurality of the support members 40 are provided to the anode 12 side which is equivalent to the side opposite the surface where surface pressure acts, ensuring that an excessive load is not imposed on the bonded region between the membrane electrode assembly 10 and the frame 20. Furthermore, in a configuration in which surface pressure acts both the direction from the anode 12 side toward the cathode 13 side and the direction from the cathode 13 side toward the anode 12 side, a plurality of the support members 40 are provided to the surface on the anode 12 side and the surface on the cathode 13 side.

Furthermore, the fuel battery cell 1 may be configured such that the support members 40 are formed integrally in the frame 20.

According to the fuel battery cell 1 thus configured, because the support members 40 are formed integrally in the frame 20, the support members 40 pressed into the membrane electrode assembly 10 do not easily peeled away from the frame 20 or easily tear. Furthermore, according to the fuel battery cell 1 thus configured, when the frame 20 is manufactured by injection molding so as to hold the outer periphery of the membrane electrode assembly 10, productivity is excellent because the support members 40 can be integrally formed simultaneously with the frame 20.

The fuel battery cell 1 may also be configured such that the support members 40 are bonded to the membrane electrode assembly 10.

According to the fuel battery cell 1 thus configured, the membrane electrode assembly 10 can be firmly bonded by the support members 40 by adhesion, welding, or the like. According to this configuration, the support members 40 need only be provided to one surface, either on the anode 12 side or the cathode 13 side, particularly even when the fuel battery cell 1 is configured such that surface pressure is applied in both the direction from the anode 12 side toward the cathode 13 side and the direction from the cathode 13 side toward the anode 12 side.

In addition, the present invention can be modified in various ways based on the configuration set forth in the claims, and such variations also belonging in the category of the present invention. In the present embodiment, a plurality of the support members 40 are provided, but a single support member 40 can also be used. The present application is based on Japanese Patent Application No. 2012-137198 submitted on Jun. 18, 2012, the disclosed contents of which are incorporated in their entirety by reference.

The invention claimed is:

1. A fuel battery cell comprising:
a membrane electrode assembly including an electrolyte membrane, an anode and a cathode bonded so as to face the electrolyte membrane;
a frame holding a periphery of the membrane electrode assembly;
a pair of separators sandwiching the frame holding the membrane electrode assembly, each of the pair of separators including a plurality of concave and convex portions that form flow channels for at least one of hydrogen-containing gas and oxygen-containing gas, a first surface of the frame being in contact with at least one of the flow channels; and
a support member disposed on the first surface of the frame and protruding from an edge part of the frame so as to extend beyond the frame in a direction toward an interior of the frame and support the membrane electrode assembly,
the support member opposing a first surface of the anode or the cathode that is opposite a second surface of the anode or the cathode that contacts the electrolyte membrane, the support member not being in direct contact with the electrolyte membrane, and
the support member having a rectangular shape and protruding from the edge part of the frame in a direction parallel to the first surface of the frame.

2. The fuel battery cell according to claim 1, wherein the support member is one of a plurality of support members, and the plurality of support members is formed along opposing edge parts within the edge part of the frame, the edge part of the frame comprising a rectangular shape.

3. The fuel battery cell according to claim 2, wherein the plurality of support members is formed in parallel with the flow channels.

4. The fuel battery cell according to claim 2, wherein the plurality of support members is adjacent to a surface of the anode or the cathode.

5. The fuel battery cell according to claim 2, wherein the plurality of support members is formed integrally in the frame.

6. The fuel battery cell according to claim 2, wherein the plurality of support members is bonded to the membrane electrode assembly.

7. The fuel battery cell according to claim 1, wherein the support member is one of a plurality of support members, and the plurality of support members is formed in parallel with the flow channels.

8. The fuel battery cell according to claim 7, wherein the plurality of support members is adjacent to a surface of the anode or the cathode.

9. The fuel battery cell according to claim 7, wherein the plurality of support members is formed integrally in the frame.

10. The fuel battery cell according to claim 7, wherein the plurality of support members is bonded to the membrane electrode assembly.

11. The fuel battery cell according to claim 1, wherein the support member is one of a plurality of support members, and the plurality of support members is adjacent to a surface of the anode or the cathode.

12. The fuel battery cell according to claim 11, wherein the plurality of support members is formed integrally in the frame.

13. The fuel battery cell according to claim 11, wherein the plurality of support members is bonded to the membrane electrode assembly.

14. The fuel battery cell according to claim 1, wherein the support member is formed integrally in the frame.

15. The fuel battery cell according to claim 14, wherein the support member is one of a plurality of support members, and the plurality of support members is bonded to the membrane electrode assembly.

16. The fuel battery cell according to claim 1, wherein the support member is bonded to the membrane electrode assembly.

17. The fuel battery cell according to claim 1, wherein the frame comprises ribs disposed in a matrix configuration.

18. A fuel battery cell comprising:
a membrane electrode assembly including an electrolyte membrane, an anode and a cathode bonded so as to face the electrolyte membrane;
a frame holding a periphery of the membrane electrode assembly;
a pair of separators sandwiching the frame holding the membrane electrode assembly, each of the pair of separators including a plurality of concave and convex portions that form flow channels for at least one of hydrogen-containing gas and oxygen-containing gas, a first surface of the frame being in contact with at least one of the flow channels; and
a support member disposed on the first surface of the frame and protruding from an edge part of the frame so as to extend beyond the frame in a direction toward an interior of the frame and support the membrane electrode assembly,
the support member opposing a first surface of the anode or the cathode in a stacking direction of the electrolyte membrane, the first surface of the anode or cathode being opposite a second surface of the anode or the cathode that contacts the electrolyte membrane, and
the support member having a rectangular shape and protruding from the edge part of the frame in a direction parallel to the first surface of the frame.

* * * * *